US010710710B2

(12) United States Patent
Price

(10) Patent No.: US 10,710,710 B2
(45) Date of Patent: Jul. 14, 2020

(54) UNMANNED AERIAL VEHICLE (UAV) COMPLIANCE USING STANDARD PROTOCOL REQUIREMENTS AND COMPONENTS TO ENABLE IDENTIFYING AND CONTROLLING ROGUE UAVS

(71) Applicant: INTERNATIONAL BUSINESS MACHINES CORPORATION, Armonk, NY (US)

(72) Inventor: Cecelia Anabel-Leigh Price, San Diego, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 15/336,200

(22) Filed: Oct. 27, 2016

(65) Prior Publication Data

US 2018/0120829 A1    May 3, 2018

(51) Int. Cl.
| | |
|---|---|
| *B64C 27/20* | (2006.01) |
| *G05D 1/00* | (2006.01) |
| *G06F 21/44* | (2013.01) |
| *G06F 21/64* | (2013.01) |
| *B64C 39/02* | (2006.01) |

(52) U.S. Cl.
CPC ............ *B64C 27/20* (2013.01); *B64C 39/024* (2013.01); *G05D 1/0022* (2013.01); *G06F 21/44* (2013.01); *G06F 21/64* (2013.01); *B64C 2201/027* (2013.01); *B64C 2201/146* (2013.01); *G06F 2221/2111* (2013.01)

(58) Field of Classification Search
CPC . B64C 27/20; B64C 39/024; B64C 2201/027; B64C 2201/146; G05D 1/0022; G06F 21/44; G06F 21/64; G06F 2221/2111
See application file for complete search history.

(56) References Cited

U.S. PATENT DOCUMENTS

| | | | |
|---|---|---|---|
| 6,729,929 B1 * | 5/2004 | Sayers | H04W 16/18 455/443 |
| 8,078,350 B2 | 12/2011 | Coulmeau | |
| 8,090,526 B2 | 1/2012 | Marty et al. | |

(Continued)

OTHER PUBLICATIONS

Rabinowitz, "Pilots Report Drone Interfering with Flights on Approach to JFK Airport", http://www.nycaviation.com/2013/03/pilots-report-drone-interfereing-with-flights-on-approach-to-jfk-airport/, NYC Aviation, Mar. 5, 2013, 3 pages.

(Continued)

*Primary Examiner* — Sze-Hon Kong
(74) *Attorney, Agent, or Firm* — Brian Restauro; Andrew D. Wright; Roberts Calderon Safran & Cole, P.C.

(57) ABSTRACT

A computer-implemented method for controlling an unmanned aerial vehicle (UAV) includes: receiving, by a computer device, UAV data from a UAV; displaying, by the computer device, a representation of the UAV on a map based on the UAV data; receiving, by the computer device, a user input to control the UAV; and transmitting, by the computer device, an authenticated control signal to the UAV based on the received user input, wherein the control signal is configured to override control of the UAV from a UAV remote controller associated with the UAV.

20 Claims, 3 Drawing Sheets

(56) References Cited

U.S. PATENT DOCUMENTS

| | | | |
|---|---|---|---|
| 8,224,508 B2 | 7/2012 | Bacabara et al. | |
| 8,521,340 B2 | 8/2013 | Coulmeau | |
| 8,725,314 B2 | 5/2014 | Chaperon et al. | |
| 8,788,118 B2 | 7/2014 | Matos | |
| 8,812,284 B2 | 8/2014 | Damiani et al. | |
| 8,838,289 B2 | 9/2014 | Margolin | |
| 9,219,981 B2 | 3/2015 | Moldavsky et al. | |
| 9,087,451 B1 | 7/2015 | Jarrell | |
| 9,216,745 B2 | 12/2015 | Beardsley et al. | |
| 9,218,741 B2 | 12/2015 | Wu et al. | |
| 9,219,990 B2 | 12/2015 | Moldavsky et al. | |
| 9,219,993 B2 | 12/2015 | Nakata et al. | |
| 9,234,728 B2 | 1/2016 | Akcasu et al. | |
| 9,235,218 B2 | 1/2016 | Levien et al. | |
| 9,254,363 B2 | 2/2016 | Levien et al. | |
| 9,257,051 B2 | 2/2016 | Farjon | |
| 9,262,929 B1 | 2/2016 | Roy et al. | |
| 9,412,278 B1* | 8/2016 | Gong | H04L 63/101 |
| 9,563,201 B1* | 2/2017 | Tofte | G05D 1/0038 |
| 9,688,399 B1* | 6/2017 | Dobbins | B64C 39/024 |
| 9,766,622 B1* | 9/2017 | Yang | B64C 39/024 |
| 9,817,396 B1* | 11/2017 | Takayama | G05D 1/0038 |
| 2004/0245376 A1* | 12/2004 | Muren | A63H 27/12 |
| | | | 244/17.11 |
| 2008/0004756 A1* | 1/2008 | Hedrick | G01C 23/00 |
| | | | 701/3 |
| 2010/0084513 A1* | 4/2010 | Gariepy | B64C 39/024 |
| | | | 244/190 |
| 2010/0228406 A1* | 9/2010 | Hamke | G05D 1/0038 |
| | | | 701/3 |
| 2010/0305778 A1* | 12/2010 | Dorneich | G05D 1/0044 |
| | | | 701/2 |
| 2012/0091260 A1* | 4/2012 | Callou | G05D 1/0858 |
| | | | 244/17.13 |
| 2012/0210853 A1 | 8/2012 | Abershitz et al. | |
| 2013/0173248 A1* | 7/2013 | Curzi | H03M 7/607 |
| | | | 704/9 |
| 2013/0210469 A1* | 8/2013 | Smith | G06Q 30/02 |
| | | | 455/466 |
| 2014/0210648 A1* | 7/2014 | Samuthirapandian | |
| | | | G08G 5/0008 |
| | | | 340/961 |
| 2014/0303814 A1* | 10/2014 | Burema | A01B 79/005 |
| | | | 701/3 |
| 2014/0316616 A1* | 10/2014 | Kugelmass | G05D 1/101 |
| | | | 701/8 |
| 2015/0097714 A1* | 4/2015 | Margolin | G01S 13/42 |
| | | | 342/29 |
| 2015/0142211 A1* | 5/2015 | Shehata | H04N 7/181 |
| | | | 701/2 |
| 2015/0147976 A1* | 5/2015 | Wang | G05D 1/0022 |
| | | | 455/65 |
| 2015/0256986 A1* | 9/2015 | Cili | H04W 4/14 |
| | | | 455/466 |
| 2015/0292901 A1* | 10/2015 | Boria | G01C 23/00 |
| | | | 340/978 |
| 2015/0321758 A1* | 11/2015 | Sarna, II | B64C 39/024 |
| | | | 244/63 |
| 2016/0117853 A1* | 4/2016 | Zhong | B64C 39/024 |
| | | | 345/634 |
| 2016/0164619 A1* | 6/2016 | Sennett | H04W 4/90 |
| | | | 455/404.1 |
| 2016/0189548 A1* | 6/2016 | Thurling | G08G 5/0013 |
| | | | 701/3 |
| 2016/0189549 A1* | 6/2016 | Marcus | G08G 5/0034 |
| | | | 701/3 |
| 2016/0244161 A1* | 8/2016 | McClure | B64C 39/024 |
| 2016/0274578 A1* | 9/2016 | Arwine | H04L 63/0823 |
| 2016/0307447 A1* | 10/2016 | Johnson | G05D 1/0044 |
| 2016/0313734 A1* | 10/2016 | Enke | G05D 1/0088 |
| 2016/0351057 A1* | 12/2016 | Elmasry | G05D 1/0022 |
| 2016/0364989 A1* | 12/2016 | Speasl | G08G 5/0034 |
| 2016/0371987 A1* | 12/2016 | Kotecha | G08G 5/0043 |
| 2017/0061813 A1* | 3/2017 | Tao | G09B 9/08 |
| 2017/0069214 A1* | 3/2017 | Dupray | G08G 5/0021 |
| 2017/0086281 A1* | 3/2017 | Avrahamy | H05B 37/0272 |
| 2017/0102241 A1* | 4/2017 | Paduano | G01C 21/20 |
| 2017/0103659 A1* | 4/2017 | Jin | G08G 5/006 |
| 2017/0148332 A1* | 5/2017 | Ziemba | H04W 76/10 |
| 2017/0154535 A1* | 6/2017 | Downey | G08G 5/0039 |
| 2017/0192427 A1* | 7/2017 | Bivans | G05D 1/0077 |
| 2017/0337826 A1* | 11/2017 | Moran | G08G 5/0013 |
| 2018/0059660 A1* | 3/2018 | Heatzig | B64D 47/08 |
| 2018/0218619 A1* | 8/2018 | Brown | G08G 5/0013 |
| 2018/0220260 A1* | 8/2018 | Li | H04W 4/029 |
| 2019/0220002 A1* | 7/2019 | Huang | B64C 39/024 |

OTHER PUBLICATIONS

Pigott, "Heathrow plane in near miss with drone", http://www.bbc.com/news/uk-30369701, BBC News, Dec. 7, 2014, 3 pages.

Whitlock, "Near-collisions between drones, airliners surge, new FAA reports show", https://www.washingtonpost.com/world/national-security/near-collisions-between-drones-airliners-surge-new-faa-reports-show/2014/11/26/9a8c1716-758c-11e4-bd1b-03009bd3e984_story.html, The Washington Post, Nov. 26, 2014, 6 Pages.

CBS Los Angeles, "Drones interfering with emergency wildfire responders", http://www.cbsnews.com/news/drones-interfering-with-emergency-wildfire-responders/, Aug. 10, 2015, 3 Pages.

Feuer, "2 Arrested After Drone Flies Close to a New York Police Helicopter", http://www.nytimes.com/2014/07/09/nyregion/two-men-arrested-after-drone-flies-near-new-york-police-helicopter.html?_r=0, The NewYork Times, Jul. 8, 2014, 3 Pages.

CBS Los Angeles, "Drone Pilot Charged With Interfering in Hollywood Police Investigation", http://losangeles.cbslocal.com/2015/09/22/drone-pilot-charged-with-interfering-in-hollywood-police-investigation/, Sep. 22, 2015, 2 pages.

ABC News, "Security Breach at White House, Unarmed Drone Lands on North Lawn", http://abcnews.go.com/Politics/video/security-breach-white-house-unarmed-drone-lands-north-28488026, Accessed Oct. 27, 2016, 1 page.

Mohammadi et al., "Modelling and Decentralized Adaptive Tracking Control of a Quadrotor UAV", RSI/ISM International Conference on Robotics and Mechatronics, Feb. 13-15, 2013, 9 Pages.

Byers et al., "Dragonfly Drones" to Address the Threat of Rogue UAVs, IP.Com, Jan. 6, 2016, 5 Pages.

Cook et al., "Intelligent Cooperative Control for Urban Tracking", J Intell Robot Syst (2014) 74:251-267, Sep. 22, 2013, 17 Pages.

CBS Los Angeles, "Drone Gets Dangerously Close to Lufthansa Jetliner Flying Into LAX", http://losangeles.cbslocal.com/2016/03/18/faa-drone-passes-over-lufthansa-flight-flying-into-lax/, Mar. 18, 2016, 2 Pages.

Blacklisted News, "Drone Legislation to Require Owners to Buy Insurance, Get License Plates—Constant GPS Tracking", http://www.blacklistednews.com/Drone_Legislation_to_Require_Owners_To_Buy_Insurance%2C_Get_License_Plates_%E2%80%93_Constant_GPS_Tracking/48337/0/38/38/Y/M.html, Jan. 15, 2016, 2 pages.

* cited by examiner

UNMANNED AERIAL VEHICLE (UAV) COMPLIANCE USING STANDARD PROTOCOL REQUIREMENTS AND COMPONENTS TO ENABLE IDENTIFYING AND CONTROLLING ROGUE UAVS

BACKGROUND

The present invention generally relates to unmanned aerial vehicles and, more particularly, to systems and methods for unmanned aerial vehicle (UAV) compliance using standard protocol requirements and components to enable identifying and controlling rogue UAVs.

An unmanned aerial vehicle (UAV), commonly known as a drone or an unmanned aircraft system (UAS), is an aircraft without a human pilot aboard. Flight of the UAV is typically controlled by the remote control of a pilot on the ground or in another vehicle. While there are many legitimate uses for UAVs, if misused accidentally or intentionally, they can interfere with or threaten the safety or security of other manned aerial vehicles (e.g., planes and helicopters). Misuse of UAVs can also interfere with functions performed by public safety officers, and with public events and gatherings. Whether the misuse of a UAV is unintentional (e.g., by accident of the UAV operator) or intentional (e.g., purposefully for nefarious purposes), any such misuse can cause public nuisance and/or public safety concerns. To address this issue, at least one regulation requires that certain UAVs be manually marked with a unique registration number similar to those numbers that appear on general aviation aircraft. However, more can be done to protect public safety.

SUMMARY

In a first aspect of the invention, there is a method for controlling an unmanned aerial vehicle (UAV) including: receiving, by a computer device, UAV data from a UAV; displaying, by the computer device, a representation of the UAV on a map based on the UAV data; receiving, by the computer device, a user input to control the UAV; and transmitting, by the computer device, a control signal to the UAV based on the received user input, wherein the control signal is configured to override control of the UAV from a UAV remote controller associated with the UAV.

In another aspect of the invention, there is a computer program product for controlling unmanned aerial vehicles (UAVs). The computer program product includes a computer readable storage medium having program instructions embodied therewith, the program instructions executable by a computing device to cause the computing device to: receive UAV data from plural UAVs; display representations of the plural UAVs on a map of a user interface; receive a user selection of one of the representations of the plural UAVs on the map, the user selection defining a selected UAV that is one of the plural UAVs; receive a user input to control the selected UAV; and transmit a control signal that is authenticated by a digital signature to the selected UAV based on the received user input, wherein the control signal is configured to override control of the selected UAV from a UAV remote controller associated with the selected UAV.

In another aspect of the invention, there is a system that includes an unmanned aerial vehicle (UAV) including: a propulsion system; a flight controller configured to control the propulsion system based on a control signal received from a UAV remote controller; a read only memory programmed with a unique Drone Identification Number (DIN); a GPS sensor configured to determine a GPS location of the UAV; an altimeter configured to determine an altitude of the UAV; and a computer processing system component to cause a transmitter to periodically broadcast the UAV's DIN, GPS location, and altitude, so that they may be received by an alternate computer device different than the UAV remote controller. The processing system component may also verify the authenticity of any control signals received by a receiver from the alternate computer device, and direct the flight controller to cause the propulsion system to obey the control signals from the alternate computer device instead of the UAV remote controller, thereby overriding the control of the UAV remote controller for a period of time that is specified by the alternate computer device along with the overriding control signal(s) that the alternate computer device transmits to the UAV.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
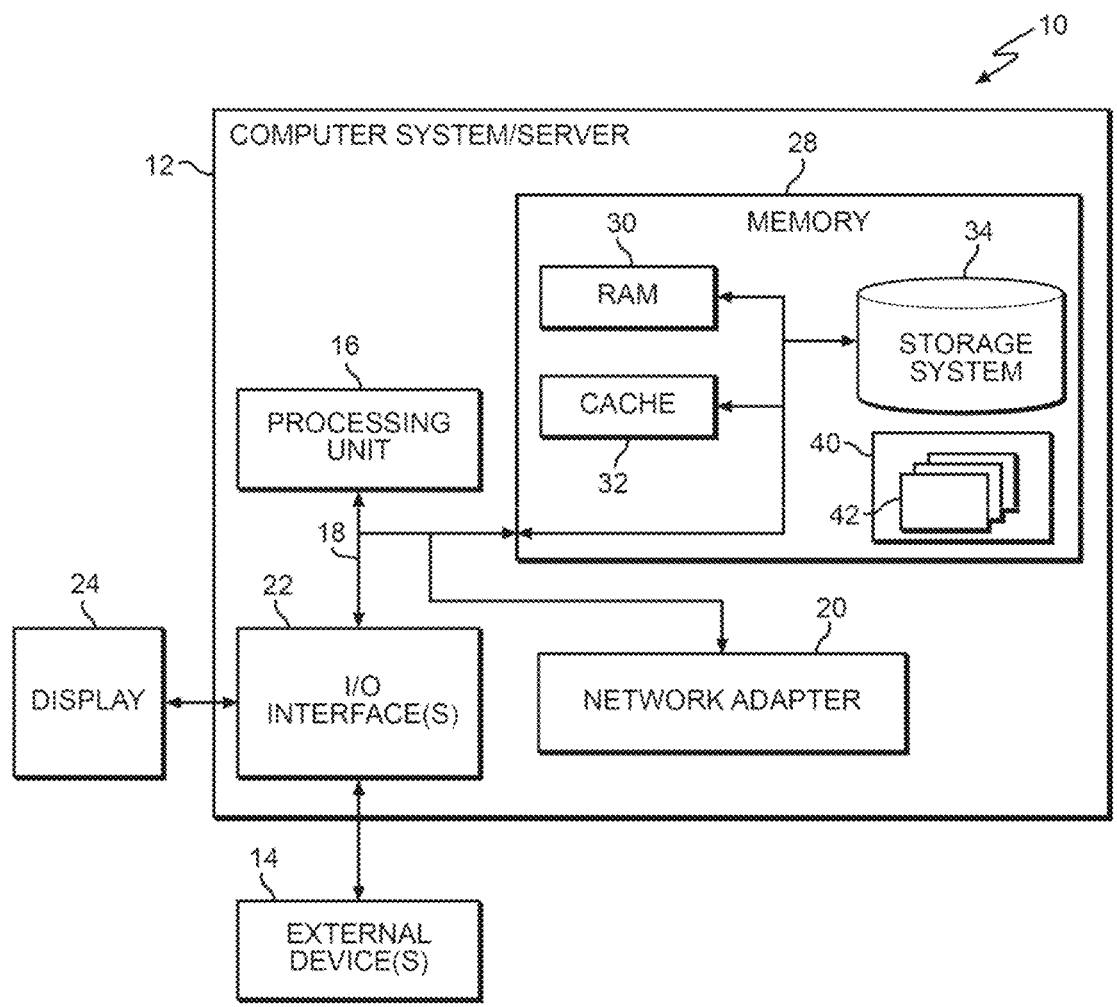
FIG. 1 depicts a computing infrastructure according to an embodiment of the present invention.

The present invention generally relates to unmanned aerial vehicles and, more particularly, to systems and methods for unmanned aerial vehicle (UAV) compliance using standard protocol requirements and components to enable identifying and controlling rogue UAVs. Aspects of the invention are directed to a standard protocol and components that enable a third party to locate and identify a rogue UAV, and transmit commands to temporarily override the UAVs operation to move the UAV away from where it should not be flying or neutralize a hazard posed by the UAV.

According to aspects of the invention, there is a processing system component for UAVs. The processing system component is configured to broadcast over a reserved cellular radio frequency the UAV's unique tamper-proof identifier (DIN), Global Positioning System (GPS) coordinates, and altitude. The processing system component is also configured to authenticate and respond to standardized commands received from a third party over a reserved cellular radio frequency which override the UAV operation and cause the UAV to immediately land, freeze (i.e., hover) then land, return to its take off location and land, or fly to specified GPS coordinates and land. In embodiments, there is also a hand-held device for use by a third party for identifying and controlling a UAV. The hand held device may be configured to receive UAV identification/location broadcasts over a reserved cellular radio frequency, and display UAV locations and movements on a GPS produced map. The hand held device may also be configured to transmit over a reserved cellular radio frequency standardized commands, authenticated by a digital signature, to a particular UAV, based on its DIN, that is flying in an unauthorized area, enabling the third party to override the UAV navigational control and remove the UAV from the unauthorized area.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
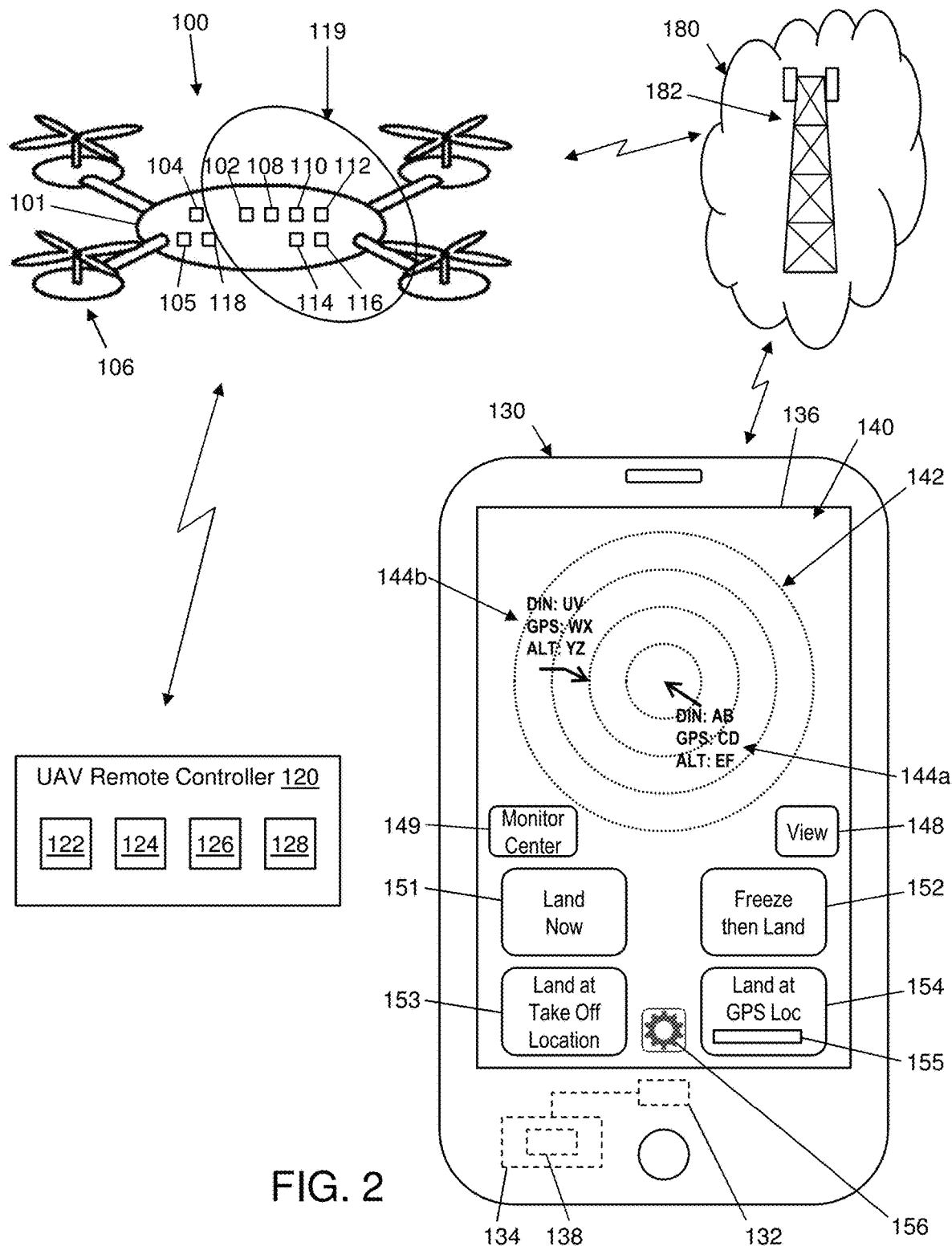
FIG. 2 shows a block diagram of an exemplary environment in accordance with aspects of the invention.

FIG. 2 shows a block diagram of an exemplary environment in accordance with aspects of the invention. The environment includes a UAV 100, a UAV remote controller 120, and a Drone Monitor And Command Transmitter (DMACT) 130. In embodiments, the UAV 100 includes a body 101 (or frame, or chassis) carrying a power source 104, a wireless communication system 105, a flight controller 118, and a propulsion system 106. The flight controller 118 is configured to control flight of the UAV 100 based on signals received from the UAV remote controller 120. The power source 104 is configured to provide power (e.g., electrical power) to the components of the UAV 100 and may comprise, for example, a rechargeable battery. The wireless communication system 105 may comprise at least one antenna, and a transmitter and receiver or transceiver configured to provide wireless transmission and reception of communication signals to and from the UAV remote controller 120. The propulsion system 106 is configured to provide a motive force and directional control to the UAV 100 and may comprise, for example, one or more Electronic Speed Controllers (ESC), motors, and propellers.

According to aspects of the invention, the UAV 100 also includes a Drone Identification And Compliance Component (DIACC) 119 comprising: a read only memory (ROM) 108; a Global Positioning System (GPS) navigation receiver 110; an altimeter 112; a transmitter 114; a receiver 116; and a computer processor 102.

In embodiments, the ROM 108 is programmed with a Drone Identification Number (DIN) that is unique to the UAV 100 compared to all other UAVs. The DIN may be programmed in the ROM 108 by the circuit manufacturer to be unchangeable (e.g., tamper proof).

The GPS receiver 110 is configured to determine and provide a GPS location of the UAV 100. In embodiments, a high-sensitivity GPS receiver is used, which results in faster "times to first fix", and the use of Satellite-Based Augmentation System (SBAS) supports wide-area or regional augmentation through the use of additional satellite-broadcast messages for greater accuracy. Other types of GPS receiver may also be used.

The altimeter 112 is configured to determine and provide an altitude, e.g., height above-ground level (AGL), of the UAV 100. In embodiments, the altimeter 112 comprises a Micro-Electro-Mechanical Systems (MEMS) barometer altimeter because it adds very little weight and takes up very little space. In such an altimeter, piezoresistive silicon pressure sensors are used, which create a change in the electrical resistance of a semiconductor or metal when mechanical strain, such as a barometric pressure change, is applied. Other types of altimeter may also be used.

The transmitter 114 is configured to broadcast the DIN (from the ROM 108), GPS coordinates (from the GPS receiver 110), and altitude (from the altimeter 112) of the UAV 100 at a predefined time interval. In embodiments, the transmitter 114 broadcasts the DIN, the GPS coordinates, and the altitude of the UAV 100 repeatedly while flying using a reserved cellular radio frequency and the Short Message Service-Cell Broadcast (SMS-CB) protocol, which uses minimal battery resources and bandwidth. The predefined time interval may be any desired interval, such as every four seconds.

The receiver 116 is configured to receive command transmissions from the DMACT 130. In embodiments, the communications from the DMACT 130 to the receiver 116 are made over a different reserved cellular radio frequency than the frequency used by the transmitter 114, and using the Short Message Service-Point to Point (SMS-PP) protocol. The SMS-PP transmission is directed to the DIACC 119 of the intended UAV based on the UAV's unique identifier (DIN) from its broadcasts. In embodiments, the DIN of each UAV is a unique addressable identifier, like a telephone number, by which the DMACT 130 can address and direct messages to a specific UAV's DIACC 119 via SMS-PP transmission.

The DIACC 119 is configured to receive commands directed to it by a DMACT 130 via the DIACC's receiver 116. When the DIACC 119 receives a command from a DMACT 130, the DIACC's computer processor 102 temporarily overrides commands from the remote controller 120 to the flight controller 118, and sends the command(s) from the DMACT 130 to the flight controller 118 which directs the propulsion system 106 accordingly. In embodiments, the DMACT 130 may direct the DIACC 119 to cause the UAV 100 to perform one of the following actions: immediately land the UAV 100 at the current UAV location; hover the UAV 100 in place at the current UAV location and altitude for a period of time specified by the DMACT and then land; fly the UAV 100 back to and land at the UAV takeoff location; or fly the UAV 100 to and land at a user-specified GPS location. In embodiments, the DIACC's computer processor 102 may be a separate processor that interfaces with the UAV's flight controller 118. Alternatively, the DIACC 119 may include flight controller functionality that is integrated within its computer processor 102 (e.g., similar to the program modules 42 of FIG. 1).

The UAV remote controller 120 is configured to communicate with and provide control signals to its associated UAV 100 for the purpose of controlling UAV functions such a flight control. The remote controller 120 is typically used by the owner of the UAV 100 or by another person with the consent of the owner of the UAV 100. The remote controller 120 may comprise a computer system having one or more components similar to those described in the computer system 12 of FIG. 1. For example, the remote controller 120 may include a processor 122 that is similar to the processing unit 16 of FIG. 1, and a control module 124 that is similar to program module 42 of FIG. 1. Additionally, the remote controller 120 may include an input/output (I/O) system 126 by which a user provides input and/or receives output. The I/O system 126 may comprise conventional components, including but not limited to any one or more of: display screen, touch screen, joystick, buttons, levers, knobs, switches, dials, etc. Further, the remote controller 120 may include a wireless communication system 128 configured to facilitate wireless communication between the remote controller 120 and the wireless communication system 105 of the UAV 100.

According to aspects of the invention, the DMACT 130 is a hand-held computer device that is separate from the remote controller 120 and that is configured to provide commands to the UAV 100 via the DIACC 119 that override commands the UAV 100 receives from the remote controller 120. The DMACT 130 is typically used by a third party different than a user that is operating the remote controller 120. The DMACT 130 may be any suitable hand-held computer device including but not limited to a tablet computer and a smartphone, and may comprise one or more components of the computer system 12 of FIG. 1 such as a processor 132 and memory 134. In embodiments, the DMACT 130 includes a touch screen display 136, such as an LCD touch screen that is configured for receiving user input via gestures such as finger taps, swipes, pinches, etc.

The DMACT 130 includes a control application 138, which may be a program module 42 as described with respect to FIG. 1, and which may be stored in the memory 134 and executed by the processor 132 to present a user interface 140 on the display 136. In embodiments, the user interface 140 displays a GPS produced map 142 showing the location of each UAV within a specified radius of a monitoring center location. The monitoring center location initially defaults to the current GPS coordinates of where the DMACT 130 is located when the application is opened. A different monitoring center location may be selected by the user tapping a "Monitor Center" button 149 on the user interface 140, and then in the window that opens entering a street address or GPS coordinates. Alternatively, in this window a "My current location" option may be selected to set or reset the monitoring center location to the GPS coordinates of where the DMACT 130 is currently located. In addition, the monitoring center location can also be adjusted, without having to use the "Monitor Center" button 149, by touching a place on the map that is not currently occupied by a displayed UAV. In the example shown in FIG. 2, the map 142 shows a representation of a first UAV 144a and a second UAV 144b.

In embodiments, each UAV on the map 142 is identified by a displayed DIN, GPS location, and altitude of the UAV. In the example shown in FIG. 2, the map 142 shows UAV 144a having a DIN of "AB", a GPS location of "CD" and an altitude (ALT) "EF". In the example shown in FIG. 2, the map 142 shows UAV 144b having a DIN of "UV", a GPS location of "WX" and an altitude (ALT) "YZ". The reference characters AB, CD, EF, UV, WX, YZ used in FIG. 2 are representative for illustrating aspects of the invention, and in operation the map 142 may show any appropriate alphanumeric characters in these places to provide the operator of the DMACT 130 a visual representation of the DIN, GPS location, and altitude of each respective UAV. In embodiments, the values of DIN, GPS location, and altitude shown on the map are based on data received from each UAV, wherein such data is broadcast from each UAV's DIACC 119 to the DMACT 130 in a manner described herein.

In embodiments, each UAV on the map 142 may also be displayed with an indicator of a speed and direction of travel. The indicator may include, for example, a line with an arrowhead that points in the direction of travel of the UAV. In the example shown in FIG. 2, the map 142 shows a line for UAV 144a, and a line for UAV 144b. The length of the line may be adjusted by the system (e.g., the control application 138) to indicate a relative flying speed of the UAV. For example, a longer line indicates a relatively faster flying speed and a shorter line indicates a relatively slower flying speed. In embodiments, the system (e.g., the control application 138) determines a direction and length of each line (depicting distance traveled within a specific number of broadcast intervals) based on data contained in successive broadcasts from each UAV's DIACC 119. As described herein, each broadcast from the UAV's DIACC 119 (e.g., UAV 100) may include a GPS location of the UAV. The system (e.g., the control application 138) may determine a direction of travel and a speed of travel of a respective UAV based on the two or more GPS locations and the two or more times associated with two or more transmissions from the respective UAV.

In embodiments, the DMACT's map 142 may be configured to look similar to an air traffic control display showing the location of each UAV within a certain radius of the monitoring center location, identified by its DIN, and showing the GPS coordinates and altitude from its most recent broadcast, as well as its direction of movement displayed as a line with an arrowhead, based upon its most recent position and its position in previous transmission intervals. The user interface 140 may also be configured to provide a toggle to optionally display the map 142 with a satellite earth view background. Such a view may be useful for reference in determining the location of UAVs relative to places on the ground. The system (e.g., the control application 138) may be configured to provide a selectable object (e.g., a button) 148 in the user interface 140 that toggles the view of the map 142 (e.g., between no background and satellite earth view background) when the user taps the display 136 at the location of the button 148. In embodiments, the map 142 may also be configured to provide display zoom in and zoom out capability using touch screen finger spread and pinch gestures.

In embodiments, the DMACT 130 is configured to permit a user to select one of the UAVs displayed on the map 142 and issue an override command to the selected UAV. For example, a user may select UAV 144a by tapping the display 136 in the area where the DIN, GPS, ALT, or arrow of UAV 144a is displayed. Upon receiving such input, the system (e.g., the control application 138) may be configured to visually highlight the display of the selected UAV (e.g., UAV 144a in this example) relative to any other UAVs displayed on the map 142.

According to aspects of the invention, the DMACT 130 is configured to transmit control signals to a UAV based on input received via the interface 140. Specifically, when a UAV is selected on the map 142 (e.g., as described herein), the user of the DMACT 130 may provide further input to the DMACT 130 that causes the DMACT 130 to transmit control signals to the selected UAV. In embodiments, the interface 140 includes any one or more selectable objects such as a first button 151, a second button 152, a third button 153, and a fourth button 154. There is also a settings button 156 which opens a window that allows the user of the DMACT 130 to adjust options within the control application 138. The buttons 151-154 and the settings button 156 are selectable by a user providing touch input to the interface 140, e.g., by tapping the display 136 with a finger or stylus.

In embodiments, the first button 151 is a "Land Now" button, the selection of which causes the DMACT 130 to transmit a "Land Now" control signal to the UAV 100. The receiver 116 of the DIACC 119 onboard the UAV 100 receives the "Land Now" control signal from the DMACT 130, and then the DIACC's processor 102 overrides the control from the remote controller 120 and passes the "Land Now" control signal to the flight controller 118. Based on receiving the "Land Now" control signal, the flight controller 118 causes the UAV 100 to land immediately, e.g., to descend in altitude at the current GPS location of the UAV 100 until the UAV 100 lands on the ground or another surface.

In embodiments, the second button 152 is a "Freeze then Land" button, the selection of which causes the DMACT 130 to transmit a "Freeze then Land" control signal to the UAV 100. The receiver 116 of the DIACC 119 onboard the UAV 100 receives the "Freeze then Land" control signal from the DMACT 130, and then the DIACC's processor 102 overrides the control from the remote controller 120 and passes the "Freeze then Land" control signal to the flight controller 118. Based on receiving the "Freeze then Land" control signal, the flight controller 118 causes the UAV 100 to hover in place, e.g., to maintain the current GPS location and altitude of the UAV 100 for a specified period of time that can be adjusted in the DMACT's control application 138 settings 156, and then land when the time has elapsed if another command from the DMACT 130 has not been issued in the meantime. The specified period of time may be set to a default value, such as three minutes, but may be adjusted by the user of the DMACT 130 to another value. In embodiments, the control application 138 prevents the specified time from being adjusted to a value higher than a maximum value, such as ten minutes. In embodiments, when the DMACT 130 issues a second "Freeze then Land" control signal subsequent to a first "Freeze then Land" control signal and prior to the expiration of the specified time for the first "Freeze then Land" control signal, the hover time of the UAV is extended (i.e., the specified time to hover is reset based on the second "Freeze then Land" control signal.) Causing the UAV to land after hovering prevents inadvertently leaving a UAV hovering until its battery charge is depleted, which could then cause it to fall from the sky. In embodiments, the "Freeze then Land" control signal may cause the UAV to land in its current location by default or at an alternate location that has been specified by a user of the DMACT 130 in the control application 138 settings 156. The alternate landing location may be specified using a street address or GPS coordinates, or by touching a location on the map 142 to define the specified GPS location. In embodiments, the "Freeze then Land" control signal that is transmitted to the UAV 100 may include data (e.g., GPS data) that defines the specified GPS location.

In embodiments, the third button 153 is a "Land at Take Off Location" button, the selection of which causes the DMACT 130 to transmit a "Land at Take Off Location" control signal to the UAV 100. The receiver 116 of the DIACC 119 onboard the UAV 100 receives the "Land at Take Off Location" control signal from the DMACT 130, and then the DIACC's processor 102 overrides the control from the remote controller 120 and passes the "Land at Take Off Location" control signal to the flight controller 118. Based on receiving the "Land at Take Off Location" control signal, the flight controller 118 causes the UAV 100 to fly to and land at the GPS location from which the UAV 100 initiated its current flight, e.g., from which the UAV 100 took off for the current flight.

In embodiments, the fourth button 154 is a "Land at GPS Location" button, the selection of which causes the DMACT 130 to transmit a "Land at GPS Location" control signal to the UAV 100. The receiver 116 of the DIACC 119 onboard the UAV 100 receives the "Land at GPS Location" control signal from the DMACT 130, and then the DIACC's processor 102 overrides the control from the remote controller 120 and passes the "Land at GPS Location" control signal to the flight controller 118. Based on receiving the "Land at GPS Location" control signal, the flight controller 118 causes the UAV 100 to fly to a GPS location specified by the DMACT 130, and to land at this specified GPS location. The interface 140 may include an input field 155 by which a user may provide input to define the specified GPS location by entering a street address or GPS coordinates. Additionally or alternatively, the system may be configured such that the DMACT 130 user may touch a location on the map 142 to define the specified GPS location or select a GPS location from a list that the user has stored in the control application 138 settings 156. In embodiments, the "Land at GPS Location" control signal that is transmitted to the UAV 100 includes data (e.g., GPS data) that defines the specified GPS location.

In embodiments, the communication between the UAV 100 and the remote controller 120 occurs directly between the UAV 100 and the remote controller 120, and the communication between the DIACC 119 of the UAV 100 and DMACT occurs via a cellular network 180. To extend the distance range of communication between the DIACC 119 on the UAV 100 and the DMACT 130, while conserving the battery power of both devices, the reserved radio frequencies on which they transmit and receive would be in a range that could be relayed by cell phone towers 182 in the cellular network 180.

As described with respect to FIG. 2, the aspects of the invention would enable UAVs to comply with third-party override UAV control plans. Each UAV (e.g., UAV 100) DIACC 119 would periodically broadcast its DIN, GPS location, and altitude on a reserved radio frequency while flying. Each UAV (e.g., UAV 100) DIACC 119 would be configured to receive and comply with authenticated commands from a third party that are transmitted via a DMACT 130. The commands received from the DMACT 130 would override commands that the UAV 100 receives from its own controller (e.g., remote controller 120), and may be configured to cause the UAV to perform one or more of: land immediately, freeze then land, land at take off location, and land at a specified location. In some embodiments, the commands from the DMACT 130 would be transmitted on a reserved radio frequency that is only available to public safety officers.

Figure 3:
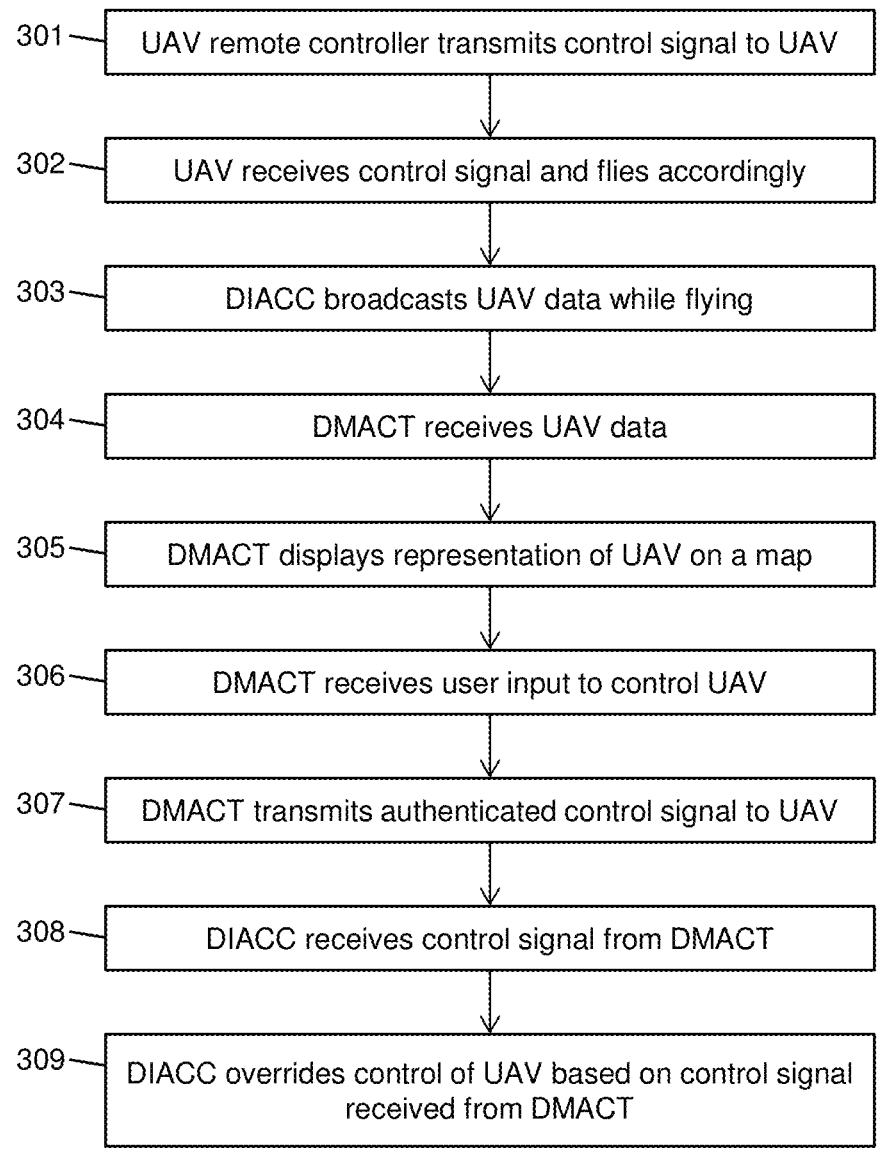
FIG. 3 shows a flowchart of a method in accordance with aspects of the invention.

FIG. 3 shows a flowchart of a method in accordance with aspects of the invention. Steps of the method of FIG. 3 may be performed in the environment illustrated in FIG. 2 and are described with reference to elements and steps shown in FIG. 2.

At step 301, the UAV remote controller 120 transmits control signal(s) to the UAV 100. Step 301 may be performed in the manner described with respect to FIG. 2.

At step 302, the UAV 100 receives the control signal(s) and flies accordingly. As described with respect to FIG. 2, the flight controller 118 may control the propulsion system 106 based on the control signal(s) received from the remote controller 120.

At step 303, the DIACC 119 onboard the UAV 100 broadcasts UAV data while flying. In embodiments, and as described with respect to FIG. 2, the UAV data includes the DIN, the GPS location, and the altitude of the UAV 100. The UAV data may be obtained from the ROM 108 (which stores the DIN), the GPS sensor 110, and the altimeter 112. The UAV data may be transmitted by the transmitter 114 of the DIACC 119. In embodiments, the transmitter 114 broadcasts the UAV data over a first reserved frequency. In a preferred embodiment, the transmitter 114 broadcasts UAV data using a reserved cellular radio frequency and the Short Message Service-Cell Broadcast (SMS-CB) protocol.

At step 304, the DMACT 130 receives the UAV data that was broadcast at step 303. As described in FIG. 2, the data may be communicated between the DIACC 119 and the DMACT 130 via a network such as a cellular network. Step 304 may include the DMACT 130 receiving respective UAV data from plural different UAVs.

At step 305, the DMACT 130 displays a representation of the UAV 100 on a map. In embodiments, and as described with respect to FIG. 2, the map may be part of the graphic user interface of the DMACT 130. The representation of the UAV 100 on the map may be based on the UAV data. For example, as described with respect to FIG. 2, the representation may include an indication of the UAV's DIN, GPS location, and altitude as defined in the UAV data. The representation may also include an indication of direction of flight and speed of flight of the UAV, e.g., using a line with an arrowhead as described with respect to FIG. 2.

At step 306, the DMACT 130 receives user input to control the UAV 100. In embodiments, and as described with respect to FIG. 2, a user of the DMACT 130 may select the UAV 100 on the map and then select a button 151-154 on the user interface.

At step 307, the DMACT 130 transmits a control signal to the UAV 100. In embodiments, and as described with respect to FIG. 2, the control signal is based on the user input. Specifically, based on the user input from step 306, the control signal of step 307 may be a signal to perform one of: Land Now, Freeze then Land, Land at Take Off Location, or Land at GPS Location, and is authenticated by a digital signature. In embodiments, the control signal of step 307 is transmitted over a second reserved frequency that is different from the first reserved frequency. In a preferred embodiment, the communication of the control signal from the DMACT 130 to the receiver 116 is made over a different reserved cellular radio frequency than the frequency used by the transmitter 114, and is made using the Short Message Service-Point to Point (SMS-PP) protocol addressed to a specific UAV by its DIN.

At step 308, the DIACC 119 (onboard the UAV 100) receives the control signal from the DMACT 130. In embodiments, and as described with respect to FIG. 2, the DIACC's receiver 116 receives the control signal.

At step 309, the DIACC 119 (onboard the UAV 100) overrides control of the UAV based on the authenticated control signal received from the DMACT 130 (received at step 308). In embodiments, and as described with respect to FIG. 2, the DIACC's receiver 116 passes the control signal to the DIACC's computer processor 102. The DIACC's computer processor 102 then directs the flight controller 118 to send flight control signals to the propulsion unit 106. The computer processor 102 and the flight controller 118 are configured such that control signals from the computer processor 102 override any concurrent (or conflicting) control signals received from the UAV remote controller 120. In embodiments, when the DMACT 130 issues a command causing the DIACC 119 to override the control of the UAV 100 by the UAV remote controller 120 and instead direct the action in the command from the DMACT 130, along with the overriding command from the DMACT 130 will be an instruction for the DIACC 119 to prevent further control of the UAV by the UAV remote controller 120 for a predetermined period of time which the third party user of the DMACT 130 can specify in the control application 138 settings 156. This prevents the UAV operator from using the UAV remote controller 120 to quickly retake control of the UAV 100, e.g. to immediately launch the UAV 100 again after the third party has used the DMACT 130 to force it to land.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling an unmanned aerial vehicle (UAV), comprising:
   receiving, by a computer device, UAV data from a UAV;
   displaying, by the computer device, a representation of the UAV on a map based on the UAV data;
   receiving, by the computer device, a user input to control the UAV; and
   transmitting, by the computer device, an authenticated control signal to the UAV based on the received user input, wherein the control signal is configured to enable a user to override control of the UAV from a UAV remote controller associated with the UAV based on determining that the UAV is in an unauthorized area, wherein the user is a third-party user different than a user operating the UAV remote control;
   removing the UAV from the unauthorized area using the override control of the control signal; and
   landing the UAV at a Global Positioning System (GPS) location specified by the third party user;
   wherein the UAV data comprises:
      a Drone Identification Number (DIN) that is unique to the UAV, wherein the DIN is a unique addressable identifier by which the computer device addresses and directs messages to the UAV via SMS-PP transmission;
      a current GPS location of the UAV; and
      a current altitude of the UAV,
   wherein the computer device comprises a Drone Monitor And Command Transmitter (DMACT),
   wherein the DMACT is configured to provide a toggle between the map with a satellite earth view background, which displays the UAV located relative to places on the ground, and the map without the satellite earth view background,
   wherein the toggle is comprised of a toggle button located on a user interface that displays the map,
   wherein the user interface further includes a monitoring center button configured to provide a window on the user interface when tapped by the user to set a monitoring center location for monitoring the current GPS location of the UAV by displaying the current GPS location of the UAV in terms of a radius from the monitoring center location,
   wherein the DMACT is configured to provide a default monitoring center location based on the current GPS coordinates of where the DMACT is currently located, and
   wherein the window is configured for the user to change the monitoring center location to a location different than the default monitoring center location.

2. The method of claim 1, wherein the displayed representation of the UAV includes the DIN of the UAV, the current GPS location of the UAV, and the current altitude of the UAV, and wherein the DMACT is a handheld device.

3. The method of claim 2, wherein the displayed representation of the UAV includes an indication of a direction of flight of the UAV and an indication of a speed of flight of the UAV.

4. The method of claim 2, wherein:
   the displayed representation of the UAV includes a line with an arrowhead displayed on the map;
   the arrowhead points in a direction of flight of the UAV;
   a length of the line indicates a relative flying speed of the UAV; and
   the DIN of the UAV, the current GPS location of the UAV, and the current altitude of the UAV are each displayed on the map as respective alpha-numeric characters adjacent to the line and the arrowhead.

5. The method of claim 1, wherein:
   the UAV data is received at a first communication frequency;
   the control signal is transmitted at a second communication frequency different from the first communication frequency; and
   wherein the GPS location specified by the user is a takeoff location of the UAV.

6. The method of claim 5, wherein the first communication frequency and the second communication frequency are reserved frequencies.

7. The method of claim 5, wherein:
the UAV data is received via Short Message Service-Cell Broadcast (SMS-CB) protocol; and
the control signal is transmitted via Short Message Service-Point to Point (SMS-PP) protocol.

8. The method of claim 1, further comprising displaying plural selectable objects in a user interface that displays the map, wherein the user input is a selection of one of the plural selectable objects, wherein the plural selectable objects include:
a first button, wherein the control signal is configured to cause the UAV to land in its current location in response to the user input being a selection of the first button;
a second button, wherein the control signal is configured to cause the UAV to hover at its current location and altitude for a specified time and land after the hovering in response to the user input being a selection of the second button;
a third button, wherein the control signal is configured to cause the UAV to land at a location from which the UAV previously took off in response to the user input being a selection of the third button; and
a fourth button, wherein the control signal is configured to cause the UAV to land at a user-specified location in response to the user input being a selection of the fourth button.

9. The method of claim 1, wherein the control signal is configured to cause the UAV to land in its current location.

10. The method of claim 1, wherein the control signal is configured to cause the UAV to hover at its current location and altitude for a specified time and land after the hovering, and the computer device permits a user to adjust the specified time.

11. The method of claim 1, wherein the control signal is configured to cause the UAV to land at a location from which the UAV previously took off.

12. The method of claim 1, wherein the control signal is configured to cause the UAV to land at a user-specified location.

13. A computer program product for controlling unmanned aerial vehicles (UAVs), the computer program product comprising a computer readable storage medium having program instructions embodied therewith, the program instructions executable by a computing device to cause the computing device to:
receive UAV data from plural UAVs;
display representations of the plural UAVs on a map of a user interface;
receive a user selection of one of the representations of the plural UAVs on the map, the user selection defining a selected UAV that is one of the plural UAVs;
receive a user input to control the selected UAV; and
transmit a control signal that is authenticated by a digital signature to the selected UAV based on the received user input, wherein the control signal is configured to enable a user to override control of the selected UAV from a UAV remote controller associated with the selected UAV based on determining that the UAV is in an unauthorized area, wherein the user is a third-party user different than a user operating the UAV remote control;
remove the UAV from the unauthorized area using the override control of the control signal; and
land the UAV at a Global Positioning System (GPS) location specified by the third party user;
wherein the UAV data is received at a first communication frequency; and the control signal is transmitted at a second communication frequency different from the first communication frequency,
wherein the computing device comprises a Drone Monitor And Command Transmitter (DMACT),
wherein the DMACT is configured to provide a toggle between the map with a satellite earth view background, which displays the UAVs located relative to places on the ground, and the map without the satellite earth view background,
wherein the toggle is comprised of a toggle button located on a user interface that displays the map,
wherein the user interface further includes a monitoring center button configured to provide a window on the user interface when tapped by the user to set a monitoring center location for monitoring the current GPS locations of the UAVs by displaying the current GPS locations of the UAVs in terms of radii from the monitoring center location,
wherein the DMACT is configured to provide a default monitoring center location based on the current GPS coordinates of where the DMACT is currently located, and
wherein the window is configured for the user to change the monitoring center location to a location different than the default monitoring center location.

14. The computer program product of claim 13, wherein the UAV data for a respective one of the plural UAVs comprises:
a Drone Identification Number (DIN) that is unique to the respective one of the plural UAVs, the DIN being a unique addressable identifier by which the computer device addresses and directs messages to the respective one of the plural UAV via SMS-PP transmission;
a current GPS location of the respective one of the plural UAVs; and
a current altitude of the respective one of the plural UAVs.

15. The computer program product of claim 13, wherein:
the UAV data is received via Short Message Service-Cell Broadcast (SMS-CB) protocol; and
the control signal is transmitted via Short Message Service-Point to Point (SMS-PP) protocol.

16. The computer program product of claim 13, wherein the control signal is configured to cause the selected UAV to perform one from the group consisting of:
land in a current location;
hover at a current location and altitude for a specified time and land after the hovering;
land at a location from which the selected UAV previously took off; and
land at a user-specified location.

17. The computer program product of claim 13, wherein:
the user interface is displayed on a touchscreen of the computing device;
the user interface simultaneously displays a view button with the map and four control buttons;
the view button is selectable via the touchscreen to cause the map to toggle between no background and a satellite earth view background; and
the four control buttons comprise:
a first button, wherein the control signal is configured to cause the UAV to land in its current location in response to a selection of the first button via the touchscreen;

a second button, wherein the control signal is configured to cause the UAV to hover at its current location and altitude for a specified time and land after the hovering in response to a selection of the second button via the touchscreen;
a third button, wherein the control signal is configured to cause the UAV to land at a location from which the UAV previously took off in response to a selection of the third button via the touchscreen; and
a fourth button, wherein the control signal is configured to cause the UAV to land at a user-specified location in response to a selection of the fourth button via the touchscreen.

18. A system, comprising:
an unmanned aerial vehicle (UAV) comprising:
a propulsion system;
a processor configured to control the propulsion system based on a control signal received from a UAV remote controller;
a read only memory programmed with a Drone Identification Number (DIN);
a GPS sensor configured to determine a GPS location of the UAV;
an altimeter configured to determine an altitude of the UAV;
a transmitter configured to broadcast the DIN, the GPS location, and the altitude to a computer device different than the UAV remote controller;
a receiver configured to receive a control signal from the computer device;
a user interface configured to display a representation of the UAV on a map based on the GPS location and the altitude of the UAV; and
a computer processor and flight controller configured to enable a user to override the control signal received from a UAV remote controller and control the propulsion system based on the authenticated control signal from the computer device and based on determining that the UAV is in an unauthorized area, wherein the user is a third-party user different than a user operating the UAV remote control;
wherein the computer processor and flight controller are configured to remove the UAV from the unauthorized area by overriding the control signal received from the UAV remote controller and landing the UAV at a Global Positioning System (GPS) location specified by the third party user, and
wherein the transmitter broadcasts the DIN, the GPS location, and the altitude via Short Message Service-Cell Broadcast (SMS-CB) protocol; and the receiver receives the control signal from the computer device via Short Message Service-Point to Point (SMS-PP) protocol,
wherein the computer processor and flight controller comprises a Drone Monitor And Command Transmitter (DMACT),
wherein the DMACT is configured to provide a toggle between the map with a satellite earth view background, which displays the UAV located relative to places on the ground, and the map without the satellite earth view background,
wherein the toggle is comprised of a toggle button located on the user interface that displays the map,
wherein the user interface further includes a monitoring center button configured to provide a window on the user interface when tapped by the user to set a monitoring center location for monitoring the current GPS location of the UAV by displaying the current GPS location of the UAV in terms of a radius from the monitoring center location,
wherein the DMACT is configured to provide a default monitoring center location based on the current GPS coordinates of where the DMACT is currently located, and
wherein the window is configured for the user to change the monitoring center location to a location different than the default monitoring center location.

19. The system of claim 18, wherein the control signal from the computer device causes the UAV to perform one from the group consisting of:
land in a current location;
hover at a current location and altitude for a specified time and land after the hovering;
land at a location from which the UAV previously took off; and
land at a user-specified location.

20. The system of claim 18, wherein the UAV further comprises a wireless communication system that is separate from the transmitter and the receiver and that is configured to provide wireless transmission and reception of communication signals to and from the UAV remote controller.

* * * * *